(12) United States Patent
Polaganga

(10) Patent No.: US 12,464,343 B2
(45) Date of Patent: Nov. 4, 2025

(54) SYSTEMS AND METHODS FOR USER EQUIPMENT TRANSFER RETURN MANAGEMENT

(71) Applicant: T-MOBILE INNOVATIONS LLC, Overland Park, KS (US)

(72) Inventor: Roopesh Kumar Polaganga, Bothell, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 371 days.

(21) Appl. No.: 18/179,732

(22) Filed: Mar. 7, 2023

(65) Prior Publication Data

US 2024/0305975 A1    Sep. 12, 2024

(51) Int. Cl.
*H04W 8/24* (2009.01)
*H04W 48/02* (2009.01)
*H04W 84/04* (2009.01)

(52) U.S. Cl.
CPC ............. *H04W 8/24* (2013.01); *H04W 48/02* (2013.01); *H04W 84/042* (2013.01)

(58) Field of Classification Search
CPC ................................ H04W 8/24; H04W 48/02
See application file for complete search history.

(56) References Cited

U.S. PATENT DOCUMENTS

| | | | |
|---|---|---|---|
| 9,374,662 B2 | 6/2016 | Siomina et al. | |
| 9,392,420 B2 | 7/2016 | Fodor et al. | |
| 2012/0252355 A1* | 10/2012 | Huang | H04W 36/0033 455/7 |
| 2016/0262059 A1* | 9/2016 | Butala | H04W 36/0033 |
| 2017/0181215 A1* | 6/2017 | Gaur | H04L 69/40 |
| 2017/0359765 A1* | 12/2017 | Chincholi | H04W 56/001 |
| 2018/0020417 A1* | 1/2018 | Catovic | H04W 4/70 |

(Continued)

OTHER PUBLICATIONS

Ferrus, Ramon et al., "Management of Network Slicing in 5G Radio Access Networks: Functional Framework and Information Models," Universitat Politècnica de Catalunya (UPC), Mar. 2018, 17 pages, Downloaded from https://www.researchgate.net/publication/323571197.

(Continued)

*Primary Examiner* — Vivek Srivastava
(74) *Attorney, Agent, or Firm* — Shook, Hardy & Bacon L.L.P.

(57) ABSTRACT

Systems and methods for user equipment (UE) transfer return management are provided. In some embodiments, a telecommunications base station may include a UE transfer return manager that monitors when a UE transfers out to a target base station, and looks for anomalous patterns of UE transfer returns that may be indicative of a PLMN incompatibility. When the UE transfer return manager detects that a UE is exhibiting an anomalous cyclical pattern of transfer returns an incompatibility may be presumed between the UE and that target base station. The incompatibility may be recorded by the UE transfer return manager to memory as UE redirection restriction data. The UE redirection restriction data may then be referenced by the source base station to forgo subsequent attempts to transfer that UE to that target base station, thus avoiding the waste of network and/or UE resources being consumed by ineffective UE transfer attempts.

20 Claims, 5 Drawing Sheets

(56) References Cited

U.S. PATENT DOCUMENTS

2019/0373525 A1* 12/2019 Singh .................... H04W 36/36
2021/0076274 A1*  3/2021 Liu ........................ H04W 8/22

OTHER PUBLICATIONS

Unknown, "HeNB-GW Administration Guide, StarOS Release 21.2," Cisco Systems, Inc., First Published Apr. 27, 2017, 82 pages.
Unknown, "HeNB-GW Administration Guide, StarOS Release 21.3," First Published Jul. 27, 2017; Last Modified Sep. 5, 2017, 84 pages.

* cited by examiner

SYSTEMS AND METHODS FOR USER EQUIPMENT TRANSFER RETURN MANAGEMENT

BACKGROUND

In cellular communications networks, a cell site base station (often referred to as a Radio Access Network (RAN)) can be designed to provide access to more than one set of network services through the use of distinct public land mobile networks (PLMNs). For example, a single RAN may be coupled through a backhaul network to different operator core networks, with each operator core network identified as a distinct PLMN with a distinct PLMN identifier. Mobile cellular user equipment (UE) belonging to one of the PLMN (e.g., a UE configured with one of the supported PLMN designated as their home PLMN) may establish active connections and/or camp on that cell site and access the communications service offered by their PLMN by communicating with its respective core network. Camping onto a cell site generally refers to the practice of a UE maintaining a connection with a base station in idle mode for the purpose of potentially moving to an active mode to establish an active communication session with the cellular communications network. A UE not belonging to one of the PLMN (e.g., a UE configured with a different PLMN designated as their home PLMN that is not connected to the RAN) may detect and receive identification information from the RAN and/or may receive and measure radio frequency (RF) signals from the RAN, but cannot establish active connections and/or camp on that cell site. As such, when a mobile UE attempts to perform a cell site transfer operation (e.g., a handover or redirection operation) from a source base station to a target base station, the success or failure of that transfer operation attempt may depend, at least in part, on whether the target base station provides access to the UE's home PLMN.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

One or more of the embodiments of the present disclosure provide for, among other things, solutions that address the problem of ineffective transfer attempts to a target base station. When a mobile UE attempts to perform a cell site transfer operation (e.g., a handover or redirection operation) from a source base station to a target base station, the success or failure of that transfer operation attempt may depend, at least in part, whether the target base station provides access to the UE's home PLMN. One or more of the embodiments presented herein provide for a UE transfer return manager that monitors when a UE transfers out to a target base station, and looks for anomalous patterns of UE transfer returns to the source base station that may be indicative of a PLMN incompatibility between the UE and the target base station. When the UE transfer return manager detects that a UE is exhibiting an anomalous cyclical pattern of transfer returns, an incompatibility may be presumed between the UE and that target base station. The incompatibility may be recorded by the UE transfer return manager to memory as UE redirection restriction data. The UE redirection restriction data may then be referenced by the source base station to forgo subsequent attempts to transfer that UE to that target base station, thus avoiding the waste of network and/or UE resources being consumed by ineffective UE transfer attempts.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Figure 1:
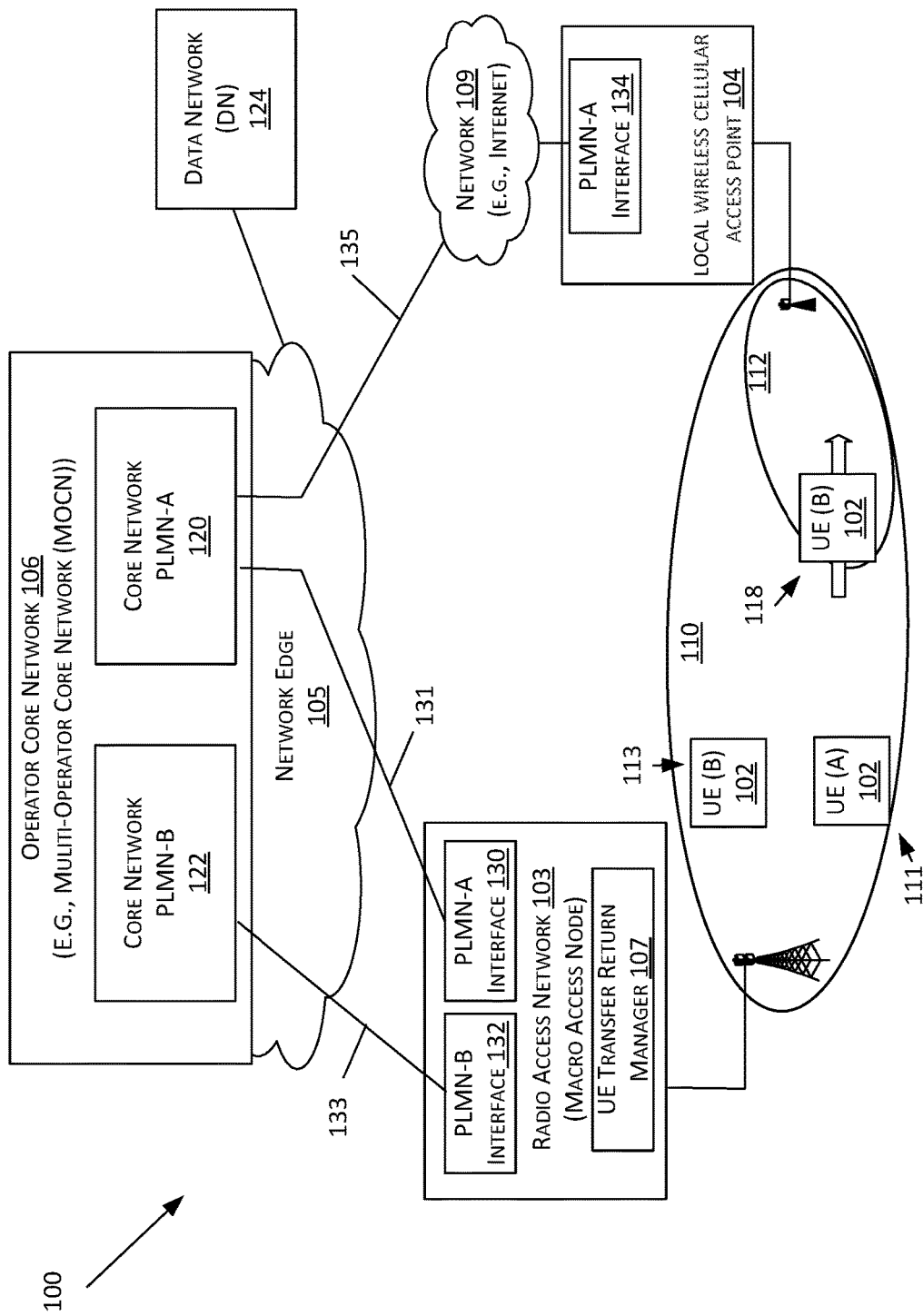
FIG. 1 is a diagrams illustrating an example network environment implementing user equipment transfer return management, in accordance with some embodiments.

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

One or more of the embodiments of the present disclosure provide for, among other things, solutions that address the problem of ineffective UE transfer attempts to a target base station. When a mobile UE attempts to perform a cell site transfer operation (e.g., a handover or redirection operation) from a source base station to a target base station, the success or failure of that transfer operation attempt may depend, at least in part, whether the target base station provides access to the UE's home PLMN. A UE may move into a region of coverage where a nearby base station may appear to be a potential candidate target base station for UE transfer based on RF measurement data collected by that UE. However, a conflict will develop in the transfer attempt if that candidate target base station detected by the UE does not support a connection with that UE's home public land mobile network (H-PLMN) and the UE may be forced to return to the source base station from which the UE transfer attempt originated. Moreover, based on the acceptable quality of the measurement data, the UE may tend to repeatedly attempt to initiate transfers to that target base station despite the fact that it does not support the UE's H-PLMN. Particularly with voice communications, repeated UE transfer failures can result in user perceivable discontinuities (e.g., user perceivable voice drops and/or gaps). Repeated ineffective UE transfer preparation attempts are detrimental to network operations because they unnecessarily consume resources of the both the source and target base stations (e.g., computing power, memory, channel bandwidth) that otherwise are used to support active UE communications links and processes.

Moreover, UE transfer actions may be performed, at least in part, over backhaul network channels between a source base station and a target base station (e.g., over an Xn interface). Ineffective UE transfer attempts to a target base stations represent wasted consumption of the backhaul network resources since the requested UE transfer is not a transfer that will ultimately be successful in connecting the UE to its home PLMN. Such repeated ineffective UE transfer preparation attempts are also detrimental to the operation of the UE because the UE repeatedly executes the process of obtaining measurement data and initiating transfer protocols that result in battery drain.

One or more of the embodiments of the present disclosure provide for, among other things, solutions that address the problem of user equipment transfer return management. In contrast to existing technologies, one or more of the embodiments presented herein provide for a UE transfer return manager that monitors when a UE transfers out to a target base station, and looks for anomalous short-cycle patterns of UE transfer returns to the source base station that may be indicative of a PLMN incompatibility (or other incompatibility) between the UE and the target base station. When the UE transfer return manager detects that a UE is exhibiting an anomalous cyclical pattern of transfer returns (e.g., a UE return pattern that meets a predetermine criteria) an incompatibility may be presumed between the UE and that target base station. The incompatibility may be recorded by the UE transfer return manager to memory as UE redirection restriction data. The UE redirection restriction data may then be referenced by the source base station to forgo subsequent attempts to transfer that UE to that target base station, thus avoiding the waste of network and/or UE resources being consumed by ineffective UE transfer attempts. The embodiments described herein thus substantially curtail repetitive ineffective UE transfer attempts. The end user also benefits from an enhanced user experience by avoiding communication disruptions caused by UE transfer delays caused by repeated ineffective transfer attempts to a target base station that does not provide access to services of their UE's home PLMN.

FIG. 1 is a diagram illustrating an example network environment 100 embodiment in which aspects of user equipment transfer return management, may be implemented. Network environment 100 is but one example of a suitable network environment and is not intended to suggest any limitation as to the scope of use or functionality of the embodiments disclosed herein. Neither should the network environment 100 be interpreted as having any dependency or requirement relating to any one or combination of components illustrated.

As shown in FIG. 1, network environment 100 comprises an operator core network 106 (also referred to as a "core network") that provides one or more wireless network services to one or more UE 102 within a coverage area 110 of at least one base station 103. UE 102 may in general, comprise forms of equipment and machines such as but, not limited to, Internet-of-Things (IoT) devices and smart appliances, autonomous or semi-autonomous vehicles including cars, trucks, trains, aircraft, urban air mobility (UAM) vehicles and/or drones, industrial machinery, robotic devices, exoskeletons, manufacturing tooling, thermostats, locks, smart speakers, lighting devices, smart receptacles, controllers, mechanical actuators, remote sensors, weather or other environmental sensors, wireless beacons, cash registers, turnstiles, security gates, or any other smart device. That said, in some embodiments, UE 102 may include computing devices such as, but not limited to, handheld personal computing devices, cellular phones, smart phones, tablets, laptops, and similar consumer equipment, or stationary desktop computing devices, workstations, servers and/or network infrastructure equipment. As such, the UE 102 may include both mobile UE and stationary UE. The UE 102 can include one or more processors, and one or more non-transient computer-readable media for executing code to carry out the functions of the UE 102 described herein. The computer-readable media may include computer-readable instructions executable by the one or more processors. In some embodiments, the UE 102 may be implemented using a computing device 400 as discussed below with respect to FIG. 4.

In particular, operator core network 106 provides combinations of network services to UE 102 for multiple public land mobile networks (PLMNs) which in FIG. 1 are represented as core network PLMN-A 120 and core network PLMN-B 122. In some embodiments, PLMN-A 120 and PLMN-B 122 essentially form separate and distinct operator core networks. In some embodiments, the operator core network 106 comprises a multi-operator core network (MOCN) of which PLMN-A 120 and PLMN-B 122 are both components. Although FIG. 1 illustrates network environment 100 as supporting two PLMN, it should be understood that for some embodiments, operator core network 106 may provide network services using any number of two or more PLMNs.

Base stations such as base station 103 are often individually referred to as a radio access network (RAN) 103 and/or a wireless communication base station system. Each RAN 103 may functions as an access node via which the UE 102 within their coverage area 103 can wirelessly access services of the operator core network 106, such as telecommunications and data connectivity (e.g., via PLMN-A 120 and/or PLMN-B 122). In the context of fourth generation (4G) Longer Term Evolution (LTE), a RAN 103 may be referred to as an eNodeB, or eNB. In the context of fifth generation (5G) New Radio (NR), a RAN 103 may be referred to as a gNodeB, or gNB). Other terminology may also be used depending on the specific implementation technology. As such, in some embodiments network environment 100 comprises, at least in part, a wireless communications network. In this disclosure, a RAN 103 may also more generally be referred to as a macro RAN (which may also be referred to as a macro access node, macrocell, and/or macro base station). In general, a macro RAN typically comprises arrays of tower or building mounted antenna that provide a coverage area that may extend, for example, one to several miles or more. Moreover, a macro RAN may utilize lower frequency bands (in addition to, or instead of, other frequency bands) that tend to penetrate the walls of buildings and other structure better than, for example, mid-band and high-band frequencies.

In some embodiments, RAN 103 may comprise a multi-modal network (for example comprising one or more multi-modal access devices) where multiple radios supporting different systems are integrated into the radio or a RAN 103. Such a multi-modal RAN 103 may support a combination of 3GPP radio technologies (e.g., 4G, 5G and/or 6G) and/or non-3GPP radio technologies. In some embodiment, a RAN 103 may comprise a terrestrial wireless communications base station and/or may be at least in part implemented as a non-terrestrial space-based access network (e.g., comprising an Earth orbiting space-based wireless communications base station).

In particular, individual UE 102 may communicate with the operator core network 106 via a RAN 103 over one or both of uplink (UL) RF signals and downlink (DL) RF signals. In some embodiments, RAN 103 may include a PLMN-A Interface 130 to provide connectivity to PLMN-A 120 for UE 102 that belong to PLMN-A 120 (such as UE (A) shown at 111). Such a UE 102 may be said to have PLMN-A 120 as its home PLMN (H-PLMN). For example, the PLMN-A Interface 130 may establish a user plane tunnel 131 between the core network PLMN-A 120 and the RAN 103 (e.g., via network edge 105). RAN 103 may further include a PLMN-B Interface 132 to provide connectivity to PLMN-B 122 for UE 102 that belong to PLMN-B 120 (such as UE (B) shown at 113). Such a UE 102 may be said to have PLMN-B 122 as its home PLMN (H-PLMN). For example, the PLMN-B Interface 132 may establish a user plane tunnel 133 between the core network PLMN-B 122 and the RAN 103 (e.g., via network edge 105). Each PDU session between the UE 102 and the core network PLMN-A 120 through the RAN 103 may be associated with a network slice and/or assigned a single network slice selection assistance information (S-NSSAI) identifier that may be unique within the context of PLMN-A 120. Each PDU session between the UE 102 and the core network PLMN-B 122 through the RAN 103 may be associated with a network slice and/or assigned a single network slice selection assistance information (S-NSSAI) identifier that may be unique within the context of PLMN-B 122. In some embodiments, RAN 103 may broadcast a system information block (SIB) comprising PLMN identities of PLMN-A 120 and PLMN-B 122.

The RAN 103 may be coupled to the operator core network 106 via a core network edge 105 that comprises wired and/or wireless network connections that may themselves include wireless relays and/or repeaters. In some embodiments, a RAN 103 is coupled to the operator core network 106 at least in part by a backhaul network such as the Internet or other public or private network infrastructure. The core network edge 105 may comprise one or more network nodes or other elements of the operator core network 106 that may define the boundary of the operator core network 106 and may serve as the architectural demarcation point where the operator core network 106 connects to other networks such as, but not limited to RAN 103, the Internet, or other third-party networks. It should be understood that in some aspects, the network environment 100 may not comprise a distinct network operator core network 106, but rather may implement one or more features of the network operator core network 106 within other portions of the network, or may not implement them at all, depending on various carrier preferences.

As shown in FIG. 1, network environment 100 further comprises at least one local wireless cellular access point 104, often referred to as a femtocell access point, that provides one or more wireless network services to one or more UE 102 within a coverage area 112 that may be substantially more limited in size than the coverage area 110 of RAN 103. As an example, a local wireless cellular access point 104 may have a form-factor about the size of a table-top appliance and an indoor coverage range of 30 to about 150 feet. In some embodiments, the local wireless cellular access point 104 is deployed as an in-building solution to provide cellular services to a UE 102, for example within a home or business. Local wireless cellular access point 104 may thus be used to enhance indoor cellular connectivity within a coverage area 112 that is within a building or enclosed facility. In some embodiments, the local wireless cellular access point 104 may communicate back with the operator core network 106 through a network connection to the Internet 109 or other network infrastructure (e.g., rather than through a dedicated backhaul network). Begin deployed to serve as a wireless connectivity solutions for a specific local customer premise, a local wireless cellular access point 104 may belong to a more limited set of PLMN than RAN 103.

For example, in FIG. 1, the local wireless cellular access point 104 may include a PLMN-A Interface 134 to provide connectivity to PLMN-A 120 for UE 102 that belong to PLMN-A 120. The PLMN-A Interface 134 may establish a user plane tunnel 135 between the core network PLMN-A 120 and the local wireless cellular access point 104 via the Internet 109. In some embodiments, each PDU session between the UE 102 and the core network PLMN-A 120 through the local wireless cellular access point 104 may be associated with a network slice and/or assigned a single network slice selection assistance information (S-NSSAI) identifier that may be unique within the context of PLMN-A 120. Accordingly, UE 102 having PLMN-A 120 as their H-PLMN (such as UE (A) shown at 111) may connect through local wireless cellular access point 104 to access network services of PLMN-A 120 when they are within the coverage area 112 of the local wireless cellular access point 104.

The network environment 100 is configured for wirelessly connecting UEs 102 to other UEs 102 via RAN 103, via local wireless cellular access point 104, via other RAN and/or other local wireless cellular access points, and/or via other telecommunication networks such as network 105 or a publicly-switched telecommunication network (PSTN), for example. The network environment 100 may be generally configured for wirelessly connecting a UE 102 to data or services that may be accessible on one or more application servers or other functions, nodes, or servers. The operating environment 100 may be generally configured, in some embodiments, for wirelessly connecting UE 102 to data or services that may be accessible on one or more application servers or other functions, nodes, or servers (such as services provided by servers of a data network 124).

As discussed above, in some embodiments, the RAN 103 may comprise UE transfer return manager 107 in order to avoid network and UE inefficiencies resulting from ineffective UE transfers to a RAN and/or a wireless cellular access point (such as local wireless cellular access point 104) that does not support the native H-PLMN of the transferring UE.

As an example, in some embodiments, the UE 102 shown at 118 is a mobile device that is programmed to utilize PLMN-B 122 as its H-PLMN. While operating in coverage area 110 and parked on RAN 103, this UE 102 can register with, and obtain the network services provided by PLMN-B 122 through user plane tunnel 133 established between PLMN-B interface 132 and PLMN-B 122. As the UE 102 approaches an edge of the coverage area 110 of RAN 103 and enters coverage area 112 (and/or enters into a building that substantially attenuates the signal from RAN 103), the UE 102 may sense (e.g., via decreasing RF signal power from RAN 103) that it is approaching the edge of coverage area 110 and therefore take one or more measurements of RF signals of neighboring base stations to seek a potential transfer (e.g., handover or re-direction). Through these measurements of RF signals, the UE 102 may identify the local wireless cellular access point 104 as a potential candidate target base station for UE transfer (e.g., a UE handover operation or a UE re-direction operation) based on RF signal quality and compatibility between the frequency bands available from local wireless cellular access point 104 and those used by UE 102. Based on the measurements, the UE 102 may send a report of measurement data (e.g., a measurement report) to the RAN 103 with information about neighboring base stations available for a potential UE transfer operation, including the local wireless cellular access point 104.

It should be noted that the frequency bands broadcast by local wireless cellular access point 104 may be, but are not necessarily the same as, those used by UE 102 to establish communication with RAN 103. For example, given the nature of the coverage area 112 established by local wireless cellular access point 104 (e.g., in-building and/or limited coverage range), the local wireless cellular access point 104 may use mid-band frequency bands such as, but not limited to, the Advanced wireless services (AWS) band, a narrowband Personal Communication Services (PCS) band, and/or 5G 1.7 Ghz to 2.5 GHz bands, for example. In some embodiments, the local wireless cellular access point 104 use high-frequency bands (e.g., 20 MHz). Such mid-band and high-band frequencies are advantageous for in-building coverage since they are able to provide high-bandwidth connectivity within the limited range of their coverage area 112, and generally are less prone to penetrate through building exterior walls thus reducing the potential for interference with RF signals available outside the building from RAN 103. A UE transfer from RAN 103 to local wireless cellular access point 104 may involve an inter-frequency UE transfer and/or an intra-frequency UE transfer.

As discussed above, the UE 102 at 118 in communication with RAN 103 may move into the region of coverage area 112 (e.g., into a building covered by local wireless cellular access point 104) so that local wireless cellular access point 104 may appear to be a potential candidate target base station for UE transfer based on the measurement data collected by that UE 102. In some embodiments, the UE 102 may obtain measurement data that includes RF channel quality measurements of RF signals of local wireless cellular access point 104 (and potentially may measure RF signals of one or more other neighboring base stations). Example quality measurements may include, but are not limited to, Reference Signal Received Power (RSRP), Reference Signal Received Quality (RSRQ), Received Signal Strength Indicator (RSSI), Synchronization Signal reference signal received power (SS-RSRP), Channel State Information reference signal received power (CSI-RSRP), and/or other signal quality measurements. In some embodiments, the measurement report may include identification information (such as a Physical Cell Identity (PCI)) associated with local wireless cellular access point 104 and/or neighboring base stations. In some embodiments, signal quality measurements of the RF signals from local wireless cellular access point 104 may exceed a quality threshold (and/or having quality measurements that exceed those of the RAN 103), such that the UE 102 may communicate the measurement report to the RAN 103 and attempt to trigger a UE transfer from RAN 103 to the local wireless cellular access point 104. The measurement report may include, for example, absolute radio-frequency channel number (ARFCN), E-UTRA Absolute Radio Frequency Channel Number (EARFCN), and/or Physical Cell ID (PCI) information corresponding to local wireless cellular access point 104.

Based on the measurement report, the RAN 103 may trigger a UE transfer of UE 102 (e.g., either a UE re-direction or UE handover) to the local wireless cellular access point 104. However, a conflict will develop in the transfer attempt once UE 102 attempts to register with, or otherwise communicate with, its H-PLMN at Core Network PLMN-B 122 because the local wireless cellular access point 104 does not support connections with Core Network PLMN-B 122. That is, while local wireless cellular access point 104 comprise a PLMN-A interface 134 to establish a user plane tunnel with Core Network PLMN-A 120, it may not comprise provisions for a PLMN-B interface to establish a user plane tunnel with Core Network PLMN-B 122 (e.g., unlike RAN 103). The RAN 103, observing that local wireless cellular access point 104 is a preferred target RAN for receiving UE 102 based on RF signal measurements, may initiate UE transfer preparations with local wireless cellular access point 104. However, even if RAN 103 and local wireless cellular access point 104 were to exchange handover request and response message (e.g., via an Xn interface channel through the network 105), the UE transfer would fail at least by the point at which UE 102 attempts radio resource control (RRC) reconfiguration or other communications with the Core Network PLMN-B 122 via local wireless cellular access point 104.

That said, even though the transfer attempt fails, the UE 102 may continue to perceive local wireless cellular access point 104 as a potential, and desirable, preferred target RAN (e.g., based on the relative RF signal strengths of local wireless cellular access point 104 versus RAN 103) and may therefore repeatedly attempt to initiate a transfer to local wireless cellular access point 104 for as long as it is located within the coverage area 112. Particularly with voice communications, repeated UE transfer failures can result in user perceivable discontinuities (e.g., user perceivable voice drops and/or gaps). Repeated ineffective UE transfer preparation attempts also consume resources of the RAN 103 (e.g., computing power, memory, channel bandwidth) that otherwise are used to support active UE communications links and processes. Moreover, these repeated ineffective UE transfer preparation attempts drain the battery of the UE 102 which repeatedly obtains measurement data and sends management reports to the RAN 103.

To mitigate and/or avoid repeated ineffective UE transfer preparation attempts, the RAN 103 may comprise an instance of the UE transfer return manager 107. The UE transfer return manager 107 monitors a UE 102 that attempts to transfer out to a target RAN, and looks for anomalous short-cycle patterns of UE transfer returns to the RAN 103 that may be indicative of a PLMN incompatibility (or other incompatibility) between a UE 102 and a target RAN, such as local wireless cellular access point 104. When UE transfer return manager 107 finds that a UE 102 is exhibiting an anomalous cyclical pattern of transfer returns (e.g., a UE return pattern that meets a predetermine criteria) a presumed incompatibility between the UE 102 and that target RAN is recorded by the UE transfer return manager 107 to memory as UE redirection restriction data.

In some embodiments, before the RAN 103 initiates a UE transfer to local wireless cellular access point 104, the UE transfer return manager 107 may check the UE transfer restriction data to determine if the UE 102 has been previously determined as incompatible with local wireless cellular access point 104 due to repeated transfer returns. If so, the RAN 103 may make a determination not to initiate transfer preparations to transfer UE 102 to local wireless cellular access point 104. The UE 102 may either then remain with RAN 103 as its source RAN, and/or in some embodiments proceed to attempt a transfer to another target RAN that is indicated as a potential candidate target base station based on the measurement data collected by the UE 102. When a UE 102 that is recorded to the UE redirection restriction data subsequently successfully transfers out to another RAN (e.g., to another macro RAN), the UE transfer return manager 107 may remove that UE 102 from the UE redirection restriction data.

Figure 2:
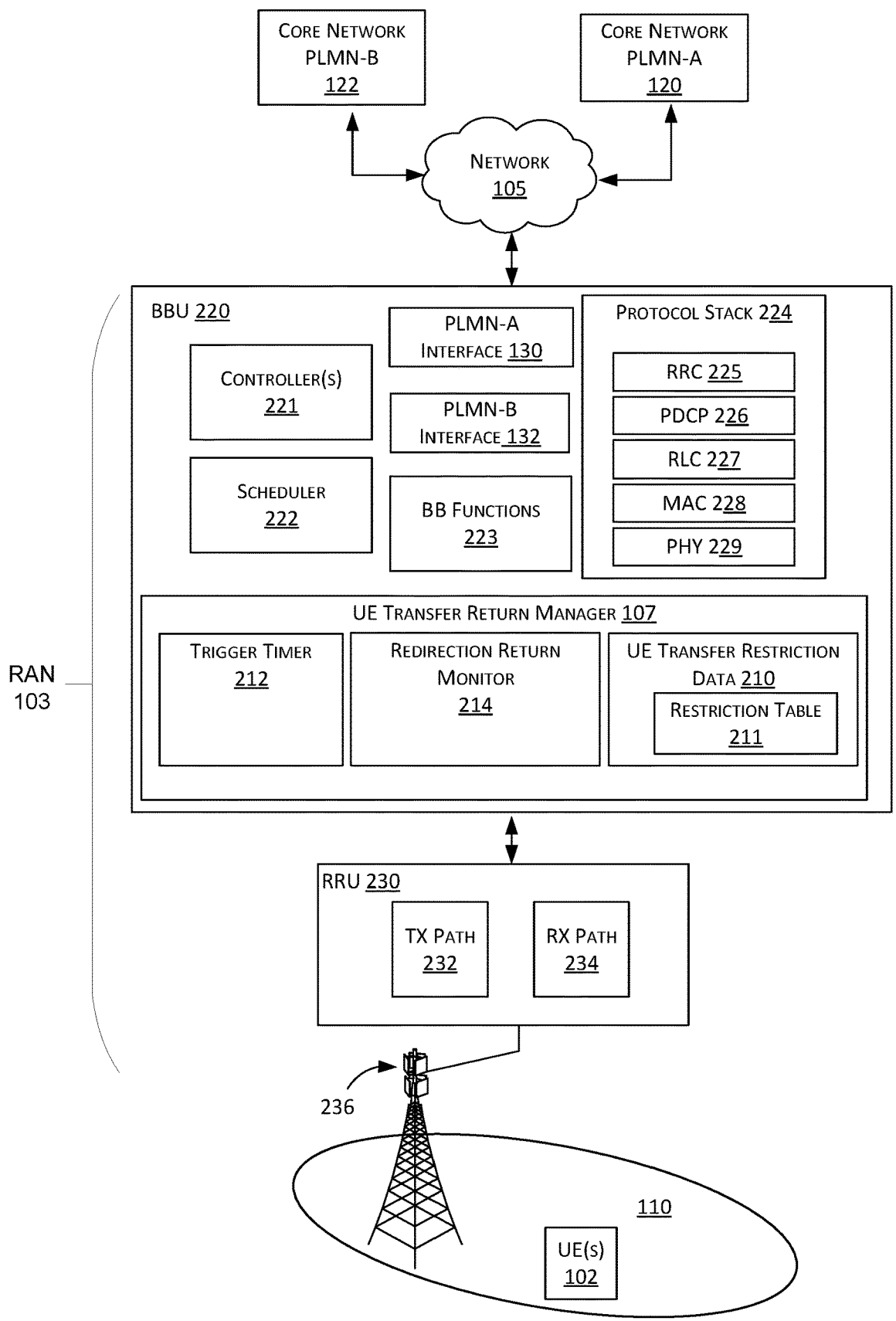
FIG. 2 is diagram illustrating an example of a radio access network for implementing user equipment transfer return management, in accordance with some embodiments.

Referring now to FIG. 2, FIG. 2 illustrates a RAN 103 such as illustrated in FIG. 1. The RAN 103 may comprise a baseband unit (BBU) 220 coupled to a least one Remote Radio Unit (RRU) 230 through which the base station 103 serves one or more UE 102 within coverage area 110. In some embodiments, the BBU 220 may comprise the Central Unit (CU) of an open-RAN (ORAN) architecture base station. The BBU 220 may comprise the circuity and functionality to implement an air interface and Open System Interconnection (OSI) Layer 1, Layer 2 and Layer 3 functions for the air interface. The RRU 230 includes a radio head comprising transmit (TX) path 232 that includes radio transmitter circuitry (such digital-to-analog converters, one or more RF filters, frequency up-converters, and/or a Power Amplifier (PA)) and receive path (RX) 234 that includes radio receiver circuitry (such analog-to-digital converters, one or more RF filters, frequency down converters, and/or a Low Noise Amplifier (LNA).) The TX path 232 and RX path 234 may be coupled to one or more antennas 236 by an appropriate coupler (such as a duplexer, for example). The antennas 236 may be physically mounted to a site tower or other structure (such as a building, for example). Downlink RF signals are radiated into coverage area 110 via TX path 232 and antenna(s) 236 for reception by the UE(s) 102. Uplink RF signals transmitted by the UE(s) 102 are received via the antenna(s) 236 and RX path 234. The RAN 103 may communicate with the UE(s) 102 using an air interface that supports Single Input Single Output (SISO), or Multiple Input Multiple Output (MIMO), Single Input Multiple Output (SIMO), Multiple Input Single Output (MISO) or other beam forming technologies. In some embodiments, the RAN 103 may optionally support multiple air interfaces and/or multiple wireless operators.

As depicted in FIG. 2, the BBU 220 may comprise one or more controllers 221 comprising a processor coupled to a memory and programed to perform one or more of the functions of the RAN 103 described herein. The UE transfer return manager 107 is an example of function on the RAN 103 that may be executed by the one or more controllers 221. In some embodiments, one or more of the base station functions described herein may be executed by one or more controllers in a distributed manner utilizing one or more network functions orchestrated or otherwise configured to execute utilizing processors and memory of the one or more controllers. For example, where RAN 103 comprises a gNodeB, the functions of the BBU 220 may be distributed between functional units comprising a Centralized Unit (CU) and at least one Distributed Unit (DU). As such, one or more functions of the base station described herein may be implemented by discrete physical devices or via virtual network functions.

The BBU 220 is responsible for, among other things, digital baseband signal processing, for example to process uplink and downlink baseband signals, shown in FIG. 2 as Baseband (BB) function(s) 223. The BBU 220 further includes a scheduler 222 through which the BBU 220 allocates resource blocks (RBs) to the UE 102 with respect to both uplink (UL) and downlink (DL) frames. A RB is the smallest unit of resource in a communication frame that can be allocated to a UE. In some embodiments, one RB is 1 slot long in time, and in frequency comprises a plurality of subcarriers each having a frequency width determined by the applicable air interface standard. For example, for LTE, one resource block is 180 kHz wide in frequency, typically comprising twelve 15 kHz subcarriers. The data carrier within each RB is referred to as the resource element (RE), which comprises 1 subcarrier×1 symbol, and transports a single complex value representing data for a channel. Functions performed by the scheduler 222 include, but are not limited to: Packet Scheduling (arbitration of access to air interface resources between active UE), resource allocation (allocation of air interface resources, such as resource blocks, to UE), and power allocations (adjusting transmit power to achieve desired data rates and signal-to-interference noise ratio (SINR) levels).

Uplink (UL) and downlink (DL) communications traffic between the BBU 220 and UE 102 are processed through a protocol stack 224 implemented by the BBU 220 that comprises various protocol stack layers. In the example embodiment illustrated in FIG. 2, the protocol stack 224 includes a radio resource control (RRC) layer 225, packet data convergence protocol (PDCP) layer 226, radio link control (RLC) layer 227, medium access control (MAC) layer 228, and physical layer (PHY) 129. The MAC layer 228 is responsible, for example, for mapping between logical channels of the RLC layer 227 and transport channels of the PHY layer 229. MAC layer 228 may also perform functions such as, but not limited to, multiplexing of MAC service data units (SDUs) from logical channels onto transport blocks (TB) to be delivered to the PHY layer 229 on transport channels, de-multiplexing of MAC SDUs from one or different logical channels from transport blocks (TB) delivered from the PHY layer 229 on transport channels, scheduling information reporting, error correction through hybrid automatic repeat requests (HARQ), priority handling between UEs by means of dynamic scheduling, priority handling between logical channels of one UE, and logical channel prioritization.

As already mentioned above, in some embodiments the BBU 220 implements the UE transfer return manager 107. The UE transfer return manager 107 works in conjunction with other operations executed by the BBU 220 to execute handover and/or re-direction UE transfer operations to facilitate the outgoing transfers of UE(s) 102 to other RAN, and the incoming transfers of UE(s) that are entering coverage area 110.

As shown in FIG. 2, the BBU 220 may include UE transfer restriction data 210 that is used by the UE transfer return manager 107 when preparing for outgoing UE transfer functions. The UE transfer restriction data 210 may be stored in a local memory of the RAN 103. The UE transfer return manager 107 may reference UE transfer restriction data 210 when transfer preparation for a UE 102 is triggered to determine if the UE's preferred target base station is listed in the UE transfer restriction data 210 as being incompatible with the UE 102 due to repeated transfer returns (e.g., due to prior failed transfers) with that target base station. If the UE's preferred target base station is listed in the UE transfer restriction data 210 as incompatible with the UE 102, the UE transfer return manager 107 may cause the RAN 103 to forgo initiating a UE transfer to that target base station. In some embodiments, the RAN 103 may instead proceed to initiate a UE transfer to another target base station that is otherwise not listed in the UE transfer restriction data 210, or instead maintain the UE 102 on UE 103.

As shown in FIG. 2, the UE transfer return manager 107 may include a trigger timer 212 and a redirection return monitor 214. The UE transfer return manager 107 may include and/or otherwise be coupled to UE transfer restriction data 210, which may be stored in a memory of the BBU 220. The UE transfer restriction data 210 may include, for example, restriction table 211 that identifies previously identified associations of target base stations (e.g., by Physical Cell Identity (PCI) and/or similar base station identifier) and UE (e.g., by Mobile Equipment Identifier (MEID), International Mobile Equipment Identity (IMEI), and/or similar equipment identifier) determined to be incompatible with each other. The UE transfer return manager 107 may then reference UE transfer restriction data 210 when transfer preparation for a UE 102 is triggered to determine if there is an incompatibility indicated between the UE 102 and a target base station and forgo proceeding with a transfer attempt between them.

The trigger timer 212 may monitor when a UE transfers out to a target RAN and begins monitoring for a return of the UE within a first time period (e.g., 2 seconds), which may be referred to as the trigger time period. If the UE does not return from the target RAN to the RAN 103 within that trigger time period, then the UE transfer may be considered successful and the trigger timer 212 resets. If the UE does return from the target RAN to the RAN 103 within the trigger time period, then the trigger timer 212 triggers activation of the redirection return monitor 214. The redirection return monitor 214 begins monitoring for additional returns of the UE to determine when the returns follow a pattern of transfer returns indicative of a PLMN incompatibility between the UE and a target RAN. For example, the redirection return monitor 214 may monitor for additional transfer returns of the UE within a second time duration, which may be referred to as a rebound time period (e.g., 5 seconds). In some embodiments, when the redirection return monitor 214 observes a predetermined number "N" of transfer returns of the UE within the rebound time, that pattern of returns may be consider as indicative of a PLMN incompatibility between the UE and the target RAN. The redirection return monitor 214 may accordingly update the UE transfer restriction data 210 to include an indication of the incompatibility between that particular paring of UE and target base station. For example, the redirection return monitor 214 may store to the UE transfer restriction data 210 an association of an identifier of the target base station and an identifier of the UE, that is designated as an incompatible association. The UE transfer return manager 107 may then reference UE transfer restriction data 210 determine an incompatible association is indicated between the UE 102 and a target base station. In some embodiments, the trigger time period, rebound time period, and number, N, of transfer returns, used for defining a pattern of returns indicative of a PLMN incompatibility are each operator selectable parameters.

In some embodiments, the UE transfer return manger 107 may reset a timing of the rebound time period based on the UE 102 transitioning from a connected mode to an idle mode. That is, in some embodiments, the redirection return monitors 214 monitoring for UE transfer returns during the rebound time duration while that UE 102 is in operating in a connected mode (e.g., having an active session established via the source cellular access point) rather than idle mode. In some embodiments, when the UE 102 switches to idle mode during the rebound time duration, the redirection return monitors 214 resets timing of rebound duration and/or may discontinue monitoring that UE 102.

In some embodiments, the UE transfer return manager 107 may periodically refresh the UE transfer restriction data 210, for example, by removing associations of incompatible target base stations and UEs. For example, the UE transfer return manager 107 may purge an association of an incompatible target base station and UE once that UE successful transfers from UE 103 to another RAN, and/or when a UE listed in the UE transfer restriction data 210 appears to have otherwise left the coverage of RAN 103 (e.g., powered down).

Figure 3:
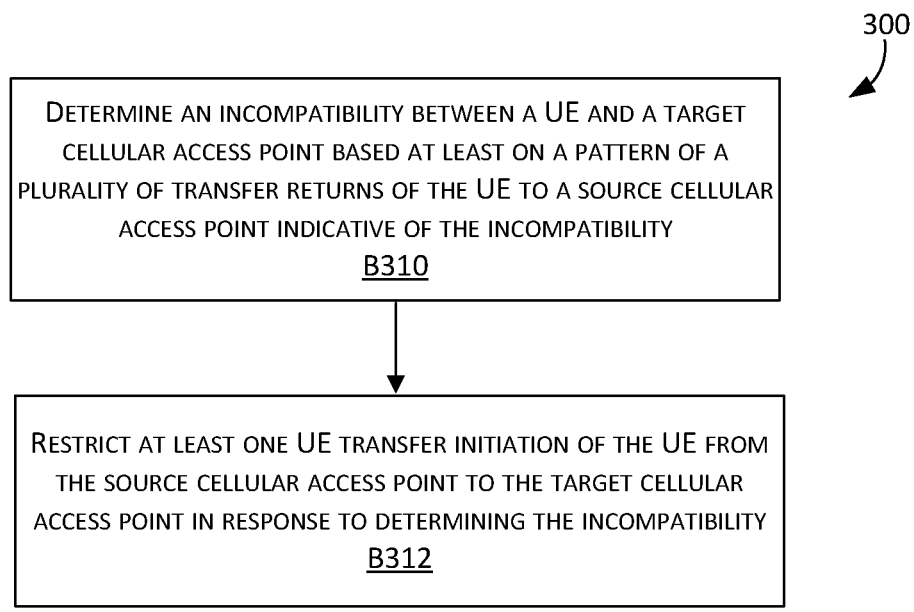
FIG. 3 is flow chart illustrating a method for user equipment transfer return management, in accordance with some embodiments.

FIG. 3 is a flow chart illustrating a method 300 for user equipment transfer return management according to an embodiment. It should be understood that the features and elements described herein with respect to the method of FIG. 3 may be used in conjunction with, in combination with, or substituted for elements of, any of the other embodiments discussed herein and vice versa. Further, it should be understood that the functions, structures, and other descriptions of elements for embodiments described in FIG. 3 may apply to like or similarly named or described elements across any of the figures and/or embodiments described herein and vice versa. In some embodiments, elements of method 300 may be implemented utilizing a UE transfer return manager 107 executing on a base station BBU, and/or a separate network node or server as discussed herein.

Method 300 at block B310 includes determining an incompatibility between a UE and a target cellular access point based at least on a pattern of a plurality of transfer returns of the UE to a source cellular access point indicative of the incompatibility. As discussed above with respect to FIGS. 1 and 2, a source cellular access point (e.g., such as a RAN 103) may initiate a UE transfer of a UE from to a target cellular access point (e.g., such as local wireless cellular access point 104). The source cellular access point and/or the target cellular access point may execute one or more functions of a wireless communication base station to communicate with one or more UE over one or both of uplink (UL) radio frequency (RF) signals and downlink (DL) RF signals. In some embodiments, as the UE approaches an edge of the coverage area of the source cellular access point (and/or into a building that substantially attenuates the signal from source cellular access point) and enters a coverage area of the target cellular access point, the UE may sense (e.g., via decreasing RF signal power from the source cellular access point) that it is approaching the edge of a coverage area and therefore takes one or more measurements of RF signals of neighboring base stations to seek a potential transfer (e.g., handover or re-direction). Through these measurements of RF signals, the UE may identify the target source cellular access point as a potential candidate target base station for UE transfer based on RF signal quality and compatibility between the frequency bands available from of the target cellular access point and those used by the UE. Based on the measurements, the UE may send a report of measurement data (e.g., a measurement report) to the source cellular access point with information about neighboring base stations available for a potential UE transfer operation, including the target cellular access point. Example quality measurements may include, but are not limited to, Reference Signal Received Power (RSRP), Reference Signal Received Quality (RSRQ), Received Signal Strength Indicator (RSSI), Synchronization Signal reference signal received power (SS-RSRP), Channel State Information reference signal received power (CSI-RSRP), and/or other signal quality measurements. In some embodiments, the measurement report may include identification information (such as a Physical Cell Identity (PCI)) associated with the target cellular access point and/or neighboring base stations. In some embodiments, signal quality measurements of the RF signals from the target cellular access point may exceed a quality threshold (and/or having quality measurements that exceed those of the source cellular access point), such that the UE may communicate the measurement report to the source cellular access point and attempt to trigger a UE transfer from the source cellular access point to the target cellular access point. The measurement report may include, for example, absolute radio-frequency channel number (ARFCN), E-UTRA Absolute Radio Frequency Channel Number (EARFCN), and/or Physical Cell ID (PCI) information corresponding to the target cellular access point. Based on the measurement report, the source cellular access point may trigger a UE transfer of the UE (e.g., either a UE re-direction or UE handover) to the target cellular access point.

As discussed above, an incompatibility between the UE and the target cellular access point may arise because the target cellular access point does not support connections with the home PLMN of the UE. In some embodiments, to detect such an incompatibility, the method may include the source cellular access point monitoring for one or more returns of the UE from the target cellular access point to the source cellular access point. The source cellular access point may (e.g., using a UE transfer return manager as discussed above) monitor for the one or more returns of the UE from the target cellular access point to the source cellular access point within a first time period, and determine the incompatibility between the UE and the target cellular access point based at least on the pattern of the plurality of transfer returns of the UE to the source cellular access point occurring within a second time period subsequent to at least one return of the UE from the target cellular access point occurring within the first time period. The first time period may begin based on an initial attempt to transfer the UE from the source cellular access point to the target cellular access point. In some embodiments, the pattern of the plurality of transfer returns of the UE to the source cellular access point is defined at least based on a number of returns of the UE to the source cellular access point exceeding a threshold number within the second time period. Detection of such a pattern may indicate an incompatibility between the UE and the target cellular access point, due to factors such as repeated radio resource control (RRC) reconfiguration failures since the UE is unable to communicate with its home PLMN. In some embodiments, the source cellular access point may reset a timing of the second time period based on the UE transitioning from a connected mode to an idle mode. That is, in some embodiments, monitoring for a retuning UE during the rebound time duration applies when that UE is in operating in a connected mode (e.g., having an active session established via the source cellular access point). In some embodiments, when the UE switches to idle mode during the rebound time duration, the rebound timer resets and the redirection return monitor may discontinue monitoring that UE.

Method 300 at block B312 includes restricting at least one subsequent UE transfer initiation of the UE from the source cellular access point to the target cellular access point in response to determining the incompatibility. For example, one a pattern of the plurality of transfer returns of the UE to the source cellular access point is determined as indicative of the incompatibility, the source cellular access point may store an indication of the incompatibility as transfer restriction data to a memory of the source cellular access point. The indication of the incompatibility to the transfer restriction data may include storing an association between an access node identification of the target access node and a UE identification of the UE. The source cellular access point may restrict subsequent UE transfer initiations of the UE from the source cellular access point to the target cellular access point based at least on the transfer restriction data.

That is, before initiating such a subsequent UE transfer initiations, the source cellular access point may refer to the transfer restriction data. If the transfer restriction data indicates an incompatibility between the UE and the source cellular access point, the source cellular access point may forgo attempting the transfer. Otherwise, if the transfer restriction data does not indicate an incompatibility between the UE and the source cellular access point, the source cellular access point may proceed with attempting the transfer.

The end user thus benefits from an enhanced user experience by avoiding UE transfer delays (whether a UE redirection operation or a UE handover operation) caused by repeated ineffective transfer attempts to a target cellular access point that does not provide access to services of the UE's home PLMN. Particularly with voice communications, UE transfer failures can result in user perceivable discontinuities (e.g., user perceivable voice drops and/or gaps). Ineffective UE transfer attempts also drain the resources of the source cellular access node (e.g., computing power, memory, channel bandwidth) that otherwise are used to support active UE communications links and processes. Moreover, UE transfer actions may be performed, at least in part, over backhaul network channels between a source base station and a target base station (e.g., over the Xn interface). Ineffective UE transfer attempts to a target base stations represent wasted consumption of the backhaul network resources since the requested UE transfer is not a transfer that will ultimately be successful in connecting the UE to its home PLMN. The embodiments described herein substantially curtail such ineffective UE transfer attempts.

Figure 4:
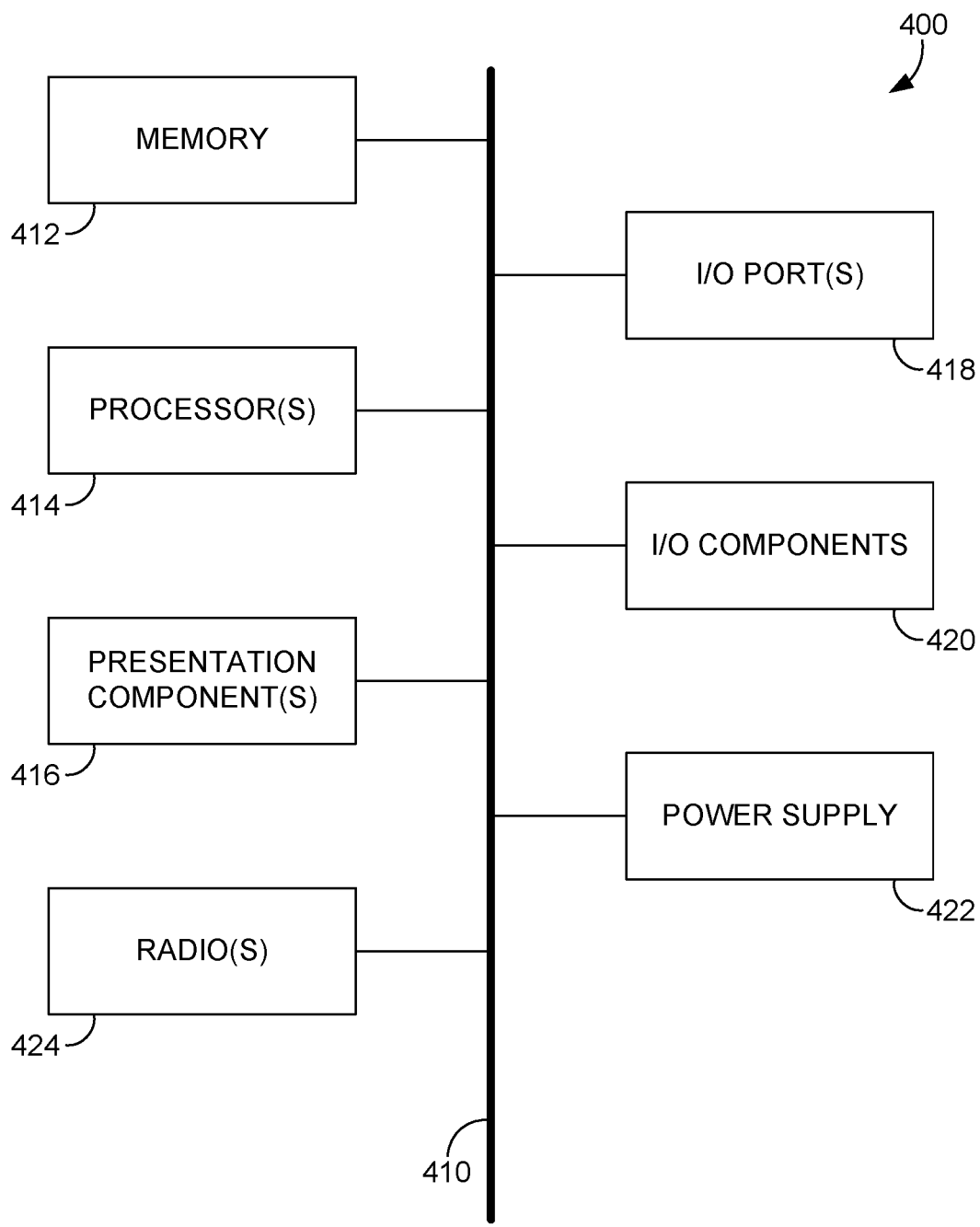
FIG. 4 is diagram illustrating an example computing environment according to an embodiment.

Referring to FIG. 4, a diagram is depicted of an exemplary computing environment suitable for use in implementations of the present disclosure. In particular, the exemplary computer environment is shown and designated generally as computing device 400. Computing device 400 is but one example of a suitable computing environment and is not intended to suggest any limitation as to the scope of use or functionality of the embodiments described herein. Neither should computing device 400 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 4, computing device 400 includes bus 410 that directly or indirectly couples the following devices: memory 412, one or more processors 414, one or more presentation components 416, input/output (I/O) ports 418, I/O components 420, power supply 422, and radio 424. Bus 410 represents what may be one or more busses (such as an address bus, data bus, or combination thereof). The components of FIG. 4 are shown with lines for the sake of clarity. However, it should be understood that the functions performed by one or more components of the computing device 400 may be combined or distributed amongst the various components. For example, a presentation component such as a display device may be one of I/O components 420. In some embodiments, a base station, RAN and/or access node implementing a UE transfer return manager 107 may comprise a computing device 400. In some embodiments, a UE, such as UE 102, may comprise a computing device such as computing device 400. In some embodiments, a local wireless cellular access point 104 may comprise a computing device such as computing device 400. The processors of computing device 400, such as one or more processors 414, have memory. The present disclosure hereof recognizes that such is the nature of the art, and reiterates that FIG. 4 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 4 and refer to "computer" or "computing device." In some embodiments, one or more aspects of UE transfer return manager 107 may be implemented at least in part by code executed by the one or more processors(s) 414 using memory 412. In some embodiments, the UE transfer restriction data 210 may be stored in memory 412 of the computing device 400 executing the UE transfer return manager 107.

Computing device 400 typically includes a variety of computer-readable media. Computer-readable media can be any available non-transient media that can be accessed by computing device 400 and includes both volatile and nonvolatile media, removable and non-removable media. By way of example, and not limitation, computer-readable media may comprise computer storage media and communication media. Computer storage media includes both volatile and nonvolatile, removable and non-removable non-transient media implemented in any method or technology for storage of information such as computer-readable instructions, data structures, program modules or other data.

Computer storage media includes non-transient RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media and computer-readable media do not comprise a propagated data signal or signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 412 includes computer-storage media in the form of volatile and/or nonvolatile memory. Memory 412 may be removable, non-removable, or a combination thereof. Exemplary memory includes solid-state memory, hard drives, optical-disc drives, etc. Computing device 400 includes one or more processors 414 that read data from various entities such as bus 410, memory 412 or I/O components 420. One or more presentation components 416 presents data indications to a person or other device. Exemplary one or more presentation components 416 include a display device, speaker, printing component, vibrating component, etc. I/O ports 418 allow computing device 400 to be logically coupled to other devices including I/O components 420, some of which may be built in computing device 400. Illustrative I/O components 420 include a microphone, joystick, game pad, satellite dish, scanner, printer, wireless device, etc.

Radio(s) 424 represents a radio that facilitates communication with a wireless telecommunications network. For example, radio(s) 424 may be used to establish communications with a UE 102 and/or network 105. Illustrative wireless telecommunications technologies include CDMA, GPRS, TDMA, GSM, 4G LTE, 3GPP 5G, and other 3GPP technologies. In some embodiments, the radio(s) 424 comprise circuits that implement a radio module of a UE 102, a RAN 103, and/or a local wireless cellular access point 104, as described herein. Radio(s) 424 may additionally or alternatively facilitate other types of non-3GPP wireless communications including Wi-Fi, WiMAX, and/or other VoIP communications. In some embodiments, radio(s) 424 may support multi-modal connections that include a combination of 3GPP radio technologies (e.g., 4G, 5G and/or 6G) and/or non-3GPP radio technologies. As can be appreciated, in various embodiments, radio(s) 424 can be configured to support multiple technologies and/or multiple radios can be utilized to support multiple technologies. In some embodiments, the radio(s) 424 may support communicating with an access network comprising a terrestrial wireless communications base station and/or a space-based access network (e.g., an access network comprising a space-based wireless communications base station). A wireless telecommunications network might include an array of devices, which are not shown so as to not obscure more relevant aspects of the embodiments described herein. Components such as a base station, a communications tower, or even access points (as well as other components) can provide wireless connectivity in some embodiments.

Figure 5:
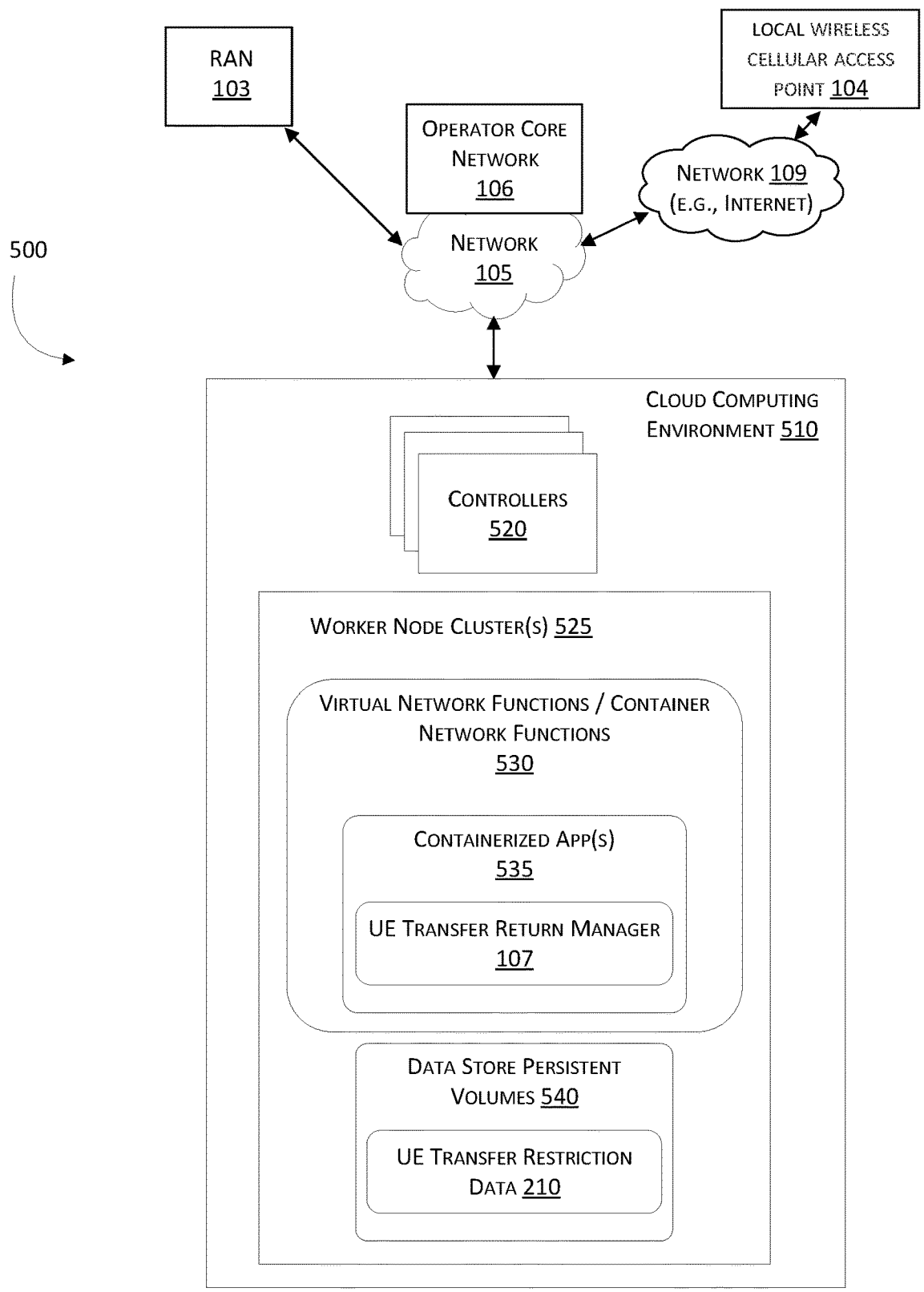
FIG. 5 is diagram illustrating an example cloud computing environment according to an embodiment.

Referring to FIG. 5, a diagram is depicted generally at 500 of an exemplary cloud computing environment 510 for implementing one or more aspects of user equipment transfer return management, such as described herein. Cloud computing environment 510 is but one example of a suitable cloud-computing environment and is not intended to suggest any limitation as to the scope of use or functionality of the embodiments presented herein. Neither should cloud-computing environment 510 be interpreted as having any dependency or requirement relating to any one or combination of components illustrated. In some embodiments, the cloud-computing environment 510 is executed within operator core network 106, the core network edge 105, or otherwise coupled to the core network edge 105 or operator core network 106.

Cloud computing environment 510 includes one or more controllers 520 comprising one or more processors and memory. The cloud computing environment 510 may include one or more data store persistent volumes 540. The controllers 520 may comprise servers of one or more data centers. In some embodiments, the controllers 520 are programmed to execute code to implement at least one or more aspects of the UE transfer return manager 107. For example, in one embodiment the UE transfer return manager 107 may be implemented, at least in part, as one or more virtual network functions (VNFs)/container network functions (CNFs) 530 running on a worker node cluster 525 established by the controllers 520. In some embodiments UE transfer restriction data may be stored using the one or more data store persistent volumes 540. The cluster of worker nodes 525 may include one or more orchestrated Kubernetes (K8s) pods that realize one or more containerized applications 535 for the UE transfer return manager 107. In other embodiments, another orchestration system may be used to realize the UE transfer return manager 107. For example the worker nodes 525 may use lightweight Kubernetes (K3s) pods, Docker Swarm instances, and/or other orchestration tools. In some embodiments, one or more elements of the RAN 103 and/or local wireless cellular access point 104 may be coupled to the controllers 520 of the cloud-computing environment 510 and/or the operator core network 106 via core network edge 105.

In various alternative embodiments, system and/or device elements, method steps, or example implementations described throughout this disclosure (such as the UE, access networks, core network edge, operator core network, RAN, base stations, access nodes, UE transfer return manager, and/or any of the sub-parts thereof, for example) may be implemented at least in part using one or more computer systems, field programmable gate arrays (FPGAs), application specific integrated circuits (ASICs) or similar devices comprising a processor coupled to a memory and executing code to realize that elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer-readable media" refers to tangible memory storage devices having non-transient physical forms. Such non-transient physical forms may include computer memory devices, such as but not limited to: punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system of device having a physical, tangible form. Program instructions include, but are not limited to, computer executable instructions executed by computer system processors and hardware description languages such as Verilog or Very High Speed Integrated Circuit (VHSIC) Hardware Description Language (VHDL).

As used herein, the terms "function", "unit", "server", "node" and "module" are used to describe computer processing components and/or one or more computer executable services being executed on one or more computer processing components. In the context of this disclosure, such terms used in this manner would be understood by one skilled in the art to refer to specific network elements and not used as nonce word or intended to invoke 35 U.S.C. 112 (f).

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for user equipment transfer return management, the system comprising:
one or more processors; and
one or more computer-readable media storing computer-usable instructions that, when executed by the one or more processors, cause the one or more processors to:
initiate a user equipment (UE) transfer of a UE from a source cellular access point to a target cellular access point;
monitor for one or more returns of the UE from the target cellular access point to the source cellular access point;
determine an incompatibility between the UE and the target cellular access point based at least on a pattern of a plurality of transfer returns of the UE to the source cellular access point indicative of the incompatibility; and
restrict at least one subsequent UE transfer initiation of the UE from the source cellular access point to the target cellular access point based at least on determination of the incompatibility.

2. The system of claim 1, the one or more processors to:
monitor for the one or more returns of the UE from the target cellular access point to the source cellular access point within a first time period; and
determine the incompatibility between the UE and the target cellular access point based at least on the pattern of the plurality of transfer returns of the UE to the source cellular access point occurring within a second time period subsequent to at least one return of the UE from the target cellular access point occurring within the first time period.

3. The system of claim 2, the one or more processors to:
start a timing of the first time period based on a first attempt to transfer the UE from the source cellular access point to the target cellular access point.

4. The system of claim 2, the one or more processors to:
reset a timing of the second time period based on the UE transitioning from a connected mode to an idle mode.

5. The system of claim 2, wherein the pattern of the plurality of transfer returns of the UE to the source cellular access point is defined at least based on a number of returns of the UE to the source cellular access point exceeding a threshold number within the second time period.

6. The system of claim 1, wherein the UE transfer comprises either a UE handover operation, or a UE redirection operation.

7. The system of claim 1, wherein the source cellular access point comprises a macro radio access network and the target cellular access point comprises a femtocell access point.

8. The system of claim 1, wherein the UE is programmed to access a public land mobile network (PLMN) accessible through the source cellular access point, wherein the PLMN is not accessible through the target cellular access point.

9. The system of claim 1, the one or more processors to:
store an indication of the incompatibility as transfer restriction data to a memory of the source cellular access point.

10. The system of claim 9, the one or more processors to:
restrict the at least one subsequent UE transfer initiation of the UE from the source cellular access point to the target cellular access point based at least on the transfer restriction data.

11. The system of claim 9, the one or more processors to:
store the indication of the incompatibility to the transfer restriction data based on an association between an access node identification of the target cellular access point and a UE identification of the UE.

12. The system of claim 1, the one or more processors to:
determine the incompatibility between the UE and the target cellular access point based at least on the pattern indicating repeat radio resource control (RRC) reconfiguration failures.

13. The system of claim 1, the one or more processors further to:
execute one or more functions of a wireless communication base station, wherein the wireless communication base station is configured to communicate with one or more UE over one or both of uplink (UL) radio frequency (RF) signals and downlink (DL) RF signals.

14. A wireless communication base station system, the system comprising:
at least one controller comprising one or more processing units to execute one or more functions of a wireless communication base station, wherein the wireless communication base station is configured to communicate with one or more user equipment (UE) over one or both of uplink (UL) radio frequency (RF) signals and downlink (DL) RF signals, the one or more processing units to further execute operations comprising:
initiate a user equipment (UE) transfer of a UE from a source cellular access point to a target cellular access point;
monitor for one or more returns of the UE from the target cellular access point to the source cellular access point;
determine an incompatibility between the UE and the target cellular access point based at least on a pattern of a plurality of transfer returns of the UE to the source cellular access point indicative of the incompatibility; and
restrict at least one subsequent UE transfer initiation of the UE from the source cellular access point to the target cellular access point based on determination of the incompatibility.

15. The system of claim 14, the one or more processing units to further execute operations comprising:
monitor for one or more returns of the UE from the target cellular access point to the source cellular access point within a first time period; and
determine the incompatibility between the UE and the target cellular access point based at least on the pattern of the plurality of transfer returns of the UE to the source cellular access point occurring within a second time period subsequent to at least one return of the UE from the target cellular access point occurring within the first time period.

16. The system of claim 14, wherein the incompatibility is based at least on the UE being programmed to access a home public land mobile network (PLMN) accessible through the source cellular access point, wherein the home PLMN is not accessible through the target cellular access point.

17. The system of claim 14, the one or more processing units to further execute operations comprising:
store an indication of the incompatibility as transfer restriction data to a memory of the source cellular access point; and
restricting the at least one subsequent UE transfer initiation of the UE from the source cellular access point to the target cellular access point based at least on the transfer restriction data.

18. A method for user equipment transfer return management, the method comprising:
determining an incompatibility between a user equipment (UE) and a target cellular access point based at least on a pattern of a plurality of transfer returns of the UE to a source cellular access point indicative of the incompatibility; and
restricting at least one UE transfer initiation of the UE from the source cellular access point to the target cellular access point in response to determining the incompatibility.

19. The method of claim 18, further comprising:
initiating a UE transfer of the UE from the source cellular access point to the target cellular access point;
monitoring for one or more returns of the UE from the target cellular access point to the source cellular access point within a first time period; and
determining the incompatibility between the UE and the target cellular access point based at least on the pattern of the plurality of transfer returns of the UE to the source cellular access point occurring within a second time period subsequent to at least one return of the UE from the target cellular access point occurring within the first time period.

20. The method of claim 18, further comprising:
storing an indication of the incompatibility as transfer restriction data to a memory of the source cellular access point; and
restricting the at least one UE transfer initiation of the UE from the source cellular access point to the target cellular access point based at least on the transfer restriction data.

* * * * *